United States Patent
Chen et al.

Patent Number: 5,891,970
Date of Patent: Apr. 6, 1999

[54] WATER-SOLUBLE SELF-ACID-DOPED POLYANILINE DERIVATIVES AND PROCESS FOR PREPARING THE SAME

[75] Inventors: Shou-An Chen; Hsien-Kuang Lin, both of Hsinchu, Taiwan

[73] Assignee: National Science Council of Republic of China, Taipei, Taiwan

[21] Appl. No.: 108,782

[22] Filed: Jul. 2, 1998

[51] Int. Cl.$^6$ .......................... C08F 283/00; C08G 75/00
[52] U.S. Cl. .......................... 525/535; 528/271; 528/373; 528/377; 528/378; 528/391; 528/397; 528/403; 528/408; 528/425; 528/482; 528/422; 524/714; 524/845; 525/540
[58] Field of Search .................... 528/271, 373, 528/377, 378, 391, 397, 403, 408, 422, 425, 482; 525/535, 540; 524/714, 845

[56] References Cited

U.S. PATENT DOCUMENTS

| | | | |
|---|---|---|---|
| 4,851,487 | 7/1989 | Yaniger et al. | 525/540 |
| 5,159,031 | 10/1992 | Epstein et al. | 525/540 |
| 5,164,465 | 11/1992 | Epstein et al. | 525/540 |
| 5,208,301 | 5/1993 | Epstein et al. | 525/540 |
| 5,237,023 | 8/1993 | Oka | 525/540 |
| 5,250,639 | 10/1993 | Oka | 525/540 |
| 5,254,670 | 10/1993 | Oka | 528/373 |
| 5,641,859 | 6/1997 | Chen et al. | 528/422 |

*Primary Examiner*—Samuel A. Acquah
*Attorney, Agent, or Firm*—Bacon & Thomas, PLLC

[57] ABSTRACT

The invention relates to a water-soluble self-acid-doped polyaniline derivatives and in particular, to a water-soluble self-acid-doped polyaniline derivatives obtained by reacting polyaniline derivatives with 2-sulfobenzoic anhydride derivatives, which is composed of structural unit having following formula (I):

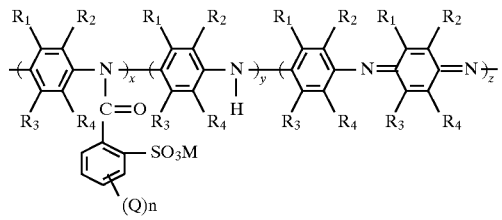

wherein,

M may be H, Na, K or $NH_4$;

$R_1$, $R_2$, $R_3$, $R_4$ may be —H, —$R_o$, —F, —Cl, —Br, —$OR_o$, —$COR_o$, —$OCOR_o$, —$NHCOR_o$, —$NO_2$, —$COOR_o$, —CN, —COOH;

Q may be —H, —Ro, —F, —Cl, —Br, —$OR_o$, —$COR_o$, —$OCOR_o$, —$NHCOR_o$, —$NO_2$, —$COOR_o$, —CN, —COOH;

$R_o$ is a $C_1$–$C_4$ alkyl;

n is an integer of 0 to 4; and $x+y+2z \leq 1.0$, and $x \geq 0.1$;

and a process for preparing the same.

The water-soluble self-acid-doped polyaniline derivatives exhibits some characteristics as follows:

(1) a high water solubility;

(2) a self-acid-doped property;

(3) a high conductivity which may be up to $10^{-3}$–$10^{-4}$ S/cm; and

(4) an easy synthetic procedure.

The invention relates also a process for preparing the above-said N-2-sulfobenzoic anhydride-substituted polyaniline derivatives by reacting polyaniline derivatives with 2-sulfobenzoic anhydride derivatives in a solvent and, optionally, in the presence of a catalyst, and precipitating and drying the reaction product.

38 Claims, 4 Drawing Sheets

I

II

III

IV

(a) Polyaniline
(b) Reduced polyaniline
(c) PABSAH
(d) PABSAH drawing of chemical structure (a)

I (b)

II (c)

III (d)

IV

(a) Polyaniline
(b) Reduced polyaniline
(c) PABSAH
(d) PABSAH drawing of chemical structure

*FIG. 1*

(a) Polyaniline
(b) PABSAH spectrum of infrared rays

FIG. 2

UV-Vis spectrum of (a) PABSAH solution & (b) PABSAH with 2% NaOH$_{(aq)}$ solution

FIG. 3

ESR spectrum of PABSAH consoliafed film

FIG. 4

WATER-SOLUBLE SELF-ACID-DOPED POLYANILINE DERIVATIVES AND PROCESS FOR PREPARING THE SAME

BACKGROUND OF THE INVENTION

1. Field of the Invention

The invention relates to a water-soluble self-acid-doped polyaniline derivatives and in particular, to a water-soluble self-acid-doped polyaniline derivatives obtained by reacting polyaniline derivatives with 2-sulfobenzioc anhydride derivatives and to a process for preparing the same.

2. Description of Related Prior Art

Many of the process for fabricating electronic elements are carried out under low moisture or vacuum where static electric charges tend to accumulate which may result into phenomena such as short-circuit or signal infidelity. Recently, use of polyaniline in antistatic application has received extensive emphases, for example, the antistatic layer on high density floppy disc (4 MB) developed by the Sony Corporation, Ltd., is comprised a material based on polyaniline (J C Lacroix, P Garcia, J P Audiere, R Clement and O Kahn, New J. Chem., 14(1990)87). In 1989, Angelopoulos et al. (J. Vac. Sci. Technol. B7(b) (1989) 1519), during the production of mask by means of electron beam, coated a doped polyaniline over the electron beam photoresist whereby a deviation of pattern position up to less than one micron can be obtained. In addition, polyanilines, in admixture with onium salts, can be used as conductive photoresists when a electron beam were used as light sources (M. Angelopoulos, J M. Shaw, K L. Lee, W S Huang, M. A. Lecorre, and M Tissier, J. Vac. Sci. Technol. B9(6)(1991)3428). Polyanilines are conjugated conducting polymers which show a high stability in air and are cheap with respect to their raw materials. However, their rigid main chains result in their poor solubilities and workabilities. They can only be dissolved in high polar and high boiling N-methyl-pyrrolidone, dimethyl sulfoxide (DMSO), m-cresol, or 80% aqueous acetic acid solution, and have relatively low or even non solubilities in common organic solvent or water. Even theretofore, doped conductive polymers have, in general, poor film-forming and mechanical properties, probably due to the increased degree of π-electron delocalization after doping. Therefore, how to enhance the mechanical strength while maintain the high conductivity of polyanilines is an important topic of research.

The structure of polyaniline is as follows:

wherein y may vary from 0 to one, representing various degree of oxidation; however, synthetic polyanilines show a value of about 0.5 for y, which are called as "emeraldine base". When y is equal to 0, they have a following structure of being completely oxidized and are called as "pernigraniline":

And when y is equal to 1, they have a following structure of being completely reduced and are called s "Leucoemeraldine base":

The value of y and hence the degree of oxidation of polyanilines can be modulated by means of electochemical or chemical methods so as to meet requirements of different characteristics.

Polyanilines can have electric conductivity after being doped by protic acidic substances which include, for example, inorganic acid (such as hydrochloric acid, sulfuric acid and phosphoric acid), small molecular organic acids (such as acetic, dodecyl benzene sulfonic, or camphorsulfonic acids) and polymeric organic acids (such as polyacrylic acid, polystyrene sulfonic acid). Polyanilines have excellent electric conductivity after being doped with inorganic acid, nevertheless, they show poor solubility and tend to be hygroscopic, and meanwhile, inorganic acids volatize readily that results in lowering of conductivity and introduces corrosive problems, thereby reduces practicability of polyanilines doped with inorganic acids. Polyanilines doped with small melecular organic acid exhibit better solubility in few high polar solvent, however, small molecular organic acid is still liable to volatize and lower the electric conductivity. Polymeric organic acids are frequently used for synthesizing polyanilines in a process called Template method (U.S. Pat. Nos. 5,370,825, and 5,489,400), wherein, in addition to provide an acidic reaction environment, polymeric organic acids play a role also in doping. Although there are no problem with respect to volatization, polymeric organic acids can have solubility only under low dosage of antioxidant that leads to low molecular weight of resulted polyanilines and lower conversion of aniline monomers.

Since polyanilines can be doped with protic acids, a self-acid-doped polyaniline can be obtained by introducing a pendant protic acid-containing group (such as —SO₃H) onto the backbone of polyanilines.

Manners for introducing pendant protic acid-containing group onto polyanilines include, for example, reacting polyanilines with fumed sulfuric acid (U.S. Pat. Nos. 5,159, 031, 5,164,465 and 5,208,301) to introduce an ortho sulfo group on the benzene ring, which resulted into a polymer having an electric conductivity of about 0.1 S/cm, being able to be dissolved in dilute alkaline aqueous solution (0.1M NH₄OH and NaOH), but sparingly dissolved in pure water, and while a great amount of spent sulfuric acid was generated, the production cost thereof as well as troublesomeness of pollution control could increase.

Reacting polyanilines with sultones can introduce an alkyl sulfonic acid group on the nitrogen atom of polyanilines (U.S. Pat. No. 5,641,859). Dehydrogenating polyanilines of emraldine base with sodium hydride and then reacting with propane sultone, the reaction product, poly(aniline-co-sodium N-propane sulfonate aniline) exhibitd relatively good water solubility, however, since it is in an undoped state, treatments by semi-permeable membrane and H-form ion exchange resin might be necessary to obtain a green aqueous solution of poly(aniline-co-N-propane sulfonic acid aniline) which, after being formed into a film, had an electric conductivity of about 10⁻²–10⁻³ S/cm. Since high electric conductivity could only occur by treating reaction products with a semi-permeable membrane and H-form ion exchange resin, the production cost tended to be high due to the cumbersome purifying procedure. By using aniline and sodium diphenylatnine-4-sulfonate as monomers, a poly (aniline-co-N-(4-sulfophenyl) aniline) having pendant sodium sulfo group could be obtained (M. T. Nguyen, P. Kasai, J L. Miller, and A F Diaz, Macromolecules, 27(1994) 3625), which, owing to the pendant sodium sulfo group, exhibitd partial solubility in water. Unfortunately, the yield of this copolymer tended to be low (the amount of products recovered was only about 19 to 70% based on the amount of the aniline monomer), while the water solubility thereof decreased as the amount of aniline used increased.

Further, by using aniline and o-anthranilic acid as monomers, a series of poly(aniline-co-o-anthranilic acid) copolymers could be synthesized (M. T. Nguyen and A F. Diaz, Macromolecules, 28(1995)3411), which could be soluble in alkaline aqueous solutions and be coated to form a film, however, yields thereof could decrease from 84% to 22% as the aniline content reduced, and electric conductivity thereof also decreased from 5.2 S/cm to $1 \times 10^{-8}$ S/cm, and meanwhile, there was a problem of low solubility in water.

In addition to the above-said manners for preparing self-acid-doped polyaniline derivatives, pendant groups can be introduced on nitrogens of polyanilines, for example, after reducing polyanilines by hydrazines, reacting the reduced polyaniline with haloalkanes, epoxy, aziridine, isocyanates, anhydrides, thiirane, isothiocyanates (U.S. Pat. No. 5,237,023), acyl chlorides (U.S. Pat. Nos. 5,254,670 and 5,250,639) and carboxy compounds (U.S. Pat. No. 5,304, 613) to introduce alkyl, aryl, polyethyleneglycol segments or polybutadiene segments. While reactions just mentioned can increase solubilities with respect to organic solvents, films formed from these reaction products still have to be doped with other acids. Since doping of polyanilines after film-forming is limited to the surface of the film (S A Chen, and H T Lee, Macromolecules, 26(1993)3254), the listed electric conductivities in the range of 0.009 to 0.5 S/cm are surface conductivities and the inner part of the film is still in an undoped state without electric conductivity. Moreover, when leucoemeradine was reacted with dicarboxyic anhydrides (U.S. Pat. No. 5,237,023), pendant carboxy group could be introduced, however, the acidity of carboxy group is too weak so that the self-acid-doping ability is not sufficient. Although the self-acid-doping ability could be promoted by means of the sulfo group in stead of the carboxy group through reacting with 4-sulfophthalic anhydride, the reaction rate was still too slow and the yield of grafting was lower. From the fact that the filn formed from the reaction product still had to be doped with sulfuric acid, it could see that the original degree of doping tended also to be lower. Furthermore, after being reduced into acidic state, these polymers exhibitd poor water solubility due to lower grafting yield and insufficient acidity.

SUMMARY OF THE INVENTION

In view of those advantages associated with the prior art technologies, in one aspect, this invention provides a water soluble self-acid-doped polyaniline derivatives by reacting polyaniline derivatives with 2-sulfobenzoic anhydrides to introduce a pendant sulfobenzoyl group on the backbone of the polyaniline. These water-soluble self-acid-doped polyaniline derivatives according to the invention exhibits some characteristics as follows:

(1) being completely soluble in water, thereby a stable aqeous solution being able to form without precipitating;
(2) having a self-acid-doped property, addition of other acids being unnecessay;
(3) having a high conductivity which may be up to $10^{-3}$–$10^{-4}$ S/cm; and (4) synthetic procedure therefor being simple, treatments by semi-permeable membrane and H-form ion exchange resins being omissible in the formation of the aqueous solution thereof;
(5) the reaction rate of polyaniline with 2-sulfobenzoic anhydride derivatives being higher than that with usual dicarboxylic anhydrides so that the grafting efficiency is higher.

In another aspect, the invention provides water-soluble self-acid-doped N-2-sulfobenzoyl substituted polyaniline derivatives prepared by introducing pendant sulfobenzoyl on polyanilines.

In still another aspect, the invention provides a process for preparing water-soluble self-acid-doped N-2-sulfobenzoyl substituted polyaniline derivatives, said process comprising reacting polyaniline derivatives with 2-sulfobenzoic anhydride derivatives in a solvent and, optionally, in the presence of a catalyst, and precipitating and drying the reaction product.

In further still another aspect, the invention provides a process for preparing water-soluble self-acid-doped N-2-sulfobenzoyl substituted N-hydrocarbylacyl-substituted polyaniline derivatives, said process comprising reacting polyaniline derivatives with 2-sulfobenzoic anhydride derivatives in a solvent and, optionally, in the presence of a catalyst, and precipitating and drying the reaction product.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

The invention relates to a water-soluble self-acid-doped N-2-sulfobenzoyl-substituted polyaniline derivatives obtained by reacting polyaniline derivatives with 2-sulfobenzoic anhydride derivatives, which is composed of structural unit having following formula (I):

wherein,
M may be H, Na, K or $NH_4$;
$R_1$, $R_2$, $R_3$, $R_4$ may be —H, —$R_o$, —F, —Cl, —Br, —$OR_o$, —$COR_o$, —$OCOR_o$, —$NHCOR_o$, —$NO_2$, —$COOR_o$, —CN, or —COOH;
Q may be —H, —$R_o$, —F, —Cl, —Br, —$OR_o$, —$COR_o$, —$OCOR_o$, —$NHCOR_o$, —$NO_2$, —$COOR_o$; —CN, or —COOH;

$R_o$ is a $C_1$–$C_4$ alkyl;

n is an integer of 0 to 4; and $x+y+2z \leq 1.0$, and $x \geq 0.1$;

In one embodiment of the invention, said N-2-sulfobenzoyl-substituted polyaniline derivatives are those having structural unit represented by formula (I) wherein $R_1$, $R_2$, $R_3$, $R_4$ are H, namely, those having structural unit represented by following formula (Ia):

wherein,

M is H, Na, K or $NH_4$;

Q may be —H, —$R_o$, —F, —Cl, —Br, —$OR_o$, —$COR_o$, —$OCOR_o$, —$NHCOR_o$, —$NO_2$, —$COOR_o$, —CN, or —COOH;

$R_o$ is a $C_1$–$C_4$ alkyl;

n is an integer of 0 to 4; and $x+y+2z \leq 1.0$, and $x \geq 0.1$;

Polyaniline derivatives useful in this invention may be those described above, namely, emeraldine base, pernigraniline and leucoemeraldine base. Among which, under the consideration of the balanced reactivity and the content of quinoid ring, the emeraldine base is the most preferable candidate. On the other hand, although leucoemeraldine base has the best solubility and reactivity, its quinoid ring content tends to be lower which results in a slightly lower electric conductivity.

Suitable 2-sulfobenzoic anhydride derivatives may be selected from those having the following structural formula (II):

wherein,

Q may be —H, —$R_o$, —F, —Cl, —Br, —$OR_o$, —$COR_o$, —$OCOR_o$, —$NHCOR_o$, —$NO_2$, —$COOR_o$, —CN, or —COOH;

$R_o$ is a $C_1$–$C_4$ alkyl;

n is an integer of 0 to 4.

More common 2-sulfobenzoic anhydride derivatives are, for example, 2-sulfobenzoic anhydride, 3,4,5,6-tetrabromo-2-sulfobenzoic anhydride, and 4-carboxy-2-sulfobenzoic anhydride. Since 2-sulfobenzoic anhydrides are more reactive than common dicarboxylic anhydride, they are easier to graft on the polyaniline to yield a self-acid-doping characteristics. Suitable equivalent ratio of 2-sulfobenzoic anhydride to polyaniline in reaction (S/N) is in the range of 0.5–3.0. Higher equivalent ratio may result in a problem of insufficient quinoid ring; conversely, a too low equivalent ratio tends to have a problem of poor solubility.

The 2-sulfobenzoic anhydrides used in the invention have a reactivity to amino group higher than that of common dicarboxylic anhydrides such as those listed in U.S. Pat. No. 5,237,023, including: phthalic anhydride, 3-nitrophthalic anhydride, maleic anhydride, diphenylmaleic anhydride, succinic anhydride, n-octyl succinic anhydride, 3-sulfophthalic anhydride, and 4-sulfophthalic anhydride, which are less reactive anhydrides that can not yield polyaniline having more graft amount even under severer reaction conditions such as higher reaction temperature or more catalysts, therefore, they have less water solubility and also lower self-acid-doping extent.

In another aspect, the invention provides a process for preparing water-soluble self-acid-doped N-2-sulfobenzoyl substituted polyaniline derivatives, said process comprising reacting polyaniline derivatives with 2-sulfobenzoic anhydride derivatives in a solvent and, optionally, in the presence of a catalyst, and precipitating and drying the reaction product.

The reaction between polyanilines and 2-sulfobenzoic anhydrides is carried out in a solvent. Suitable solvents includes, for example, N-methyl-2-pyrrolidone, dimethyl sulfoxide, cyclohexanone, dioxane, and tetrahydrofuran. Among which, N-methyl-2-pyrrolidone is the preferred one.

Suitable amount of catalysts can be used in the reaction of polyanilines with 2-sulfobenzoic anhydrides. Suitable catalysts useful in the reaction may be, for example, pyridine, N,N-dimethylaminopyridine, and triethylamine. Catalysts can promote the reaction, however, more steps for purifying reaction products are invariably necessitated. In order to remove excess catalysts, reactants, solvents or impurities, a precipitating method can be employed. Solvents used in the precipitating method are, for example, acetone, acetonitrile, methyl ethyl ketone, ethanol or methanol, which can separate the desired reaction product from catalysts, reactants and solvents. After being purified by precipitating, the reaction products are soluble in water to form a green solution, indicating that the desired polyaniline derivatives are in doped state.

Although aqueous solution of water soluble polyanilines can be obtained by the precipitating method, it still contains some impurities. Therefore, for materials whose purity are highly required, for example, for those used in electronic industry, in addition to precipitating method, the reaction product may need to be purified by semi-permeation method and ion exchange method. The semi-permeation method uses semi-permeable membranes having a molecular weight cut of at most less than 1000 so that the reaction product can be separated. The ion exchange method uses H-form ion exchange resin which can remove cations such as sodium, potassium, ammonium ions and the like or catalysts such as pyridine, N,N-dimethylaminopyridine and the like. These purification methods can be used alone or in combination of two or more methods thereof. Among which, the precipitating method is the fastest and most efficient method. In general, the prior art polyaniline derivatives are soluble in water only after being treated by acid or base or after purified, and most of them can not be redissolved in water after being dried under vacuum. Surprisingly, it is found that a highly water-soluble self-acid-doped polyaniline derivatives can be obtained by just using precipitating method according to the invention, and further, they can be redissolved in water after vacuum dried, which constitutes one of the important features of the invention. Moreover, by using precipitating method in combination with semi-permeation method or ion exchange method, the purity of the resulted self-acid-doped polyaniline derivatives can be promoted so that they can be used in processes that require higher cleanness in electronic industry.

Within the above-described water-soluble self-acid-doped polyaniline derivatives, it is preferable that x is in the range of 0.1 to 0.9, more preferably, in the range of 0.2 to 0.7. If x is greater than 0.9, insufficient quinoid ring might lower the electric conductivity. On the other hand, if x is less than 0.1, its water solubility will be poor and extent of doping tends to be lower. The value of y is suitably in the range of 0.1 to 0.5. If y is less than 0.1, the polaron can not occur readily that will result in lowering of the electric conductivity; on the other hand, if y is greater than 0.5, insufficient quinoid ring will lower the electric conductivity. Whereas the value of z is suitably in the range of 0.025 to 0.25, where, if z is less than 0.025, insufficient quinoid ring will lower the electric conductivity; and on the other hand, a z value of greater than 0.25 will yield a poor water solubility.

The molecular weight of the water-soluble self-acid-doped polyaniline derivatives is desirably in the range of 1,000 to 1,000,000. If the molecular weight is greater than 1,000,000, the water solubility will be poor; wheres if less than 1,000, the film-forming property will be poor.

The water-soluble self-acid-doped polyaniline derivatives according to the invention need not be doped with other acids. The electric conductivity thereof can be up to about $10^{-3}$ to $10^{-6}$ S/cm which, by means of appropriate process control, can be regulated approximately in the range of $10^{-3}$ to $10^{-4}$ S/cm. This range of electric conductivity can, after blended with other suitable polymers, meet with the requirements of materials for electrostatic discharge, $10^{-5}$ S/cm, and antistaticity, $10^{-9}$ S/cm.

Further, in another aspect, the water-soluble self-acid-doped polyaniline derivatives according to the invention can be prepared by incorporating an alkanoyl halide in the reaction of polyaniline and 2-sulfobenzoic anhydrides, and resulting into a self-acid-doped polyaniline derivative having a structural unit represented by the following formula (III) in the backbone thereof:

(III)

wherein, $R_1$, $R_2$, $R_3$, $R_4$ may be —H, —$R_o$, —F, —Cl, —Br, —$OR_o$, —$COR_o$, —$OCOR_o$, —$NHCOR_o$, —$NO_2$, —$COOR_o$, —CN, or —COOH; —$COOR_o$; —CN, —COOH;

$R_o$ is a $C_1$–$C_4$ alkyl;

$R_5$ is an alkyl or alkenyl having a carbon number of 6 to 18; and $x+y+2z+w \leq 1.0$, and $x \geq 0.1$.

The long chain alkyl group can be introduced by reacting polyanilines with alkanoyl halides. Suitable alkanoyl halides may include, for example, octanoyl chloride, decanoyl chloride, dodecanoyl chloride, pahlitoyl chloride, and stearoyl chloride. When the carbon number of the long chain alkyl group is less than 6, the solubility in the organic solvents will be worse; whereas if the carbon number of the long chain alkyl group is more than 18, the electric conductivity will be worse due to the too long pendant group.

In one embodiment of the invention, $R_1$, $R_2$, $R_3$, and $R_4$ in the above formula (III) are H, that is, a structure represented by the following formula (IIIa):

(IIIa)

wherein, $R_5$ is an alkyl or alkenyl having a carbon number of 6 to 18; and $x+y+2z+w \leq 1.0$, and $x \geq 0.1$.

Accordingly, these water-soluble self-acid-doped polyaniline derivatives according to the invention can solve the problem of difficult processing associated with the prior art polyanilines and exhibits some characteristics as follows:

(1) being completely soluble in water, thereby a stable aqeous solution having solid content of more than 5% being able to form without precipitating;

(2) having a self-acid-doped property, addition of other acids being unnecessay;

(3) having a high conductivity which may be up to $10^{-3}$–$10^{-4}$ S/cm; and (4) synthetic procedure therefor being simple, treatments by semi-permeable membrane and H-form ion exchange resins being omissible in the formation of the aqueous solution thereof;

(5) the reaction rate of polyanilines with 2-sulfobenzoic anhydride derivatives being higher than that with usual dicarboxylic anhydrides so that the grafting being higher.

Furthermore, a comparisson between the application with the inventor's U.S. Pat. No. 5,641,859 is provided in the following table

|  | the application | USP5641859 |
| --- | --- | --- |
| Polymers | PABSAH | PAPSAH |
| Pendant graft[a] | 30–38% (see example 3 and 4) | 50% |
| Electric conductivity | $10^{-3}$–$10^{-4}$ s/cm (see the optimal condition in Example 4)[b] | $10^{-2}$–$10^{-3}$ s/cm |
| Preparation | 1. Dehydrogenation by sodium hydride is unneeded. | 1. Need dehydrogenation by Sodium hydride |
|  | 2. Reaction product is in doped state during precipitation | 2. Reaction product is in undoped state after precipitation. It need be treated by semi-permeation and ion |
|  | 3. precipitation of reaction products with HCl is unnecessary in the process | |

| | the application | USP5641859 |
|---|---|---|
| Solubility before film-forming | Precipitates can be dissolved directly in water. | exchange to become in doped state.<br>3. large amount of HCl is needed. The process to precipitate the reaction product precipitates must be dissolved in NaOH and subjected to semi-permeation and ion exchange before forming aqueous solution thereof. |
| Solubility after film-forming | can be dissolved directly in water or NaOH$_{(aq)}$ at graft amount of more than 38%; soluble in NaOH$_{(aq)}$ only at small graft amount. of 30% | soluble only in NaOH$_{(aq)}$. | a. Both of a too large and too small graft amount are not favor for electric conductivity, and it is preferable in the range of 30–38%.
b. Although the electric conductivity of the application ($10^{-3}$–$10^{-4}$ S/cm) is slightly less than that of the USP'859 ($10^{-2}$–$10^{-3}$ S/cm), the application has several advantages such as a simple preparation procedure, lower cost, and the electric conductivity thereof ($10^{-3}$–$10^{-4}$ S/cm) meeting the requirement for antistatic material ($10^{-3}$–$10^{-9}$ S/cm), and hence, has useful value in industry.
c. In general, larger graft amount results in higher water solubility, but the electric conductivity may not be better.

Accordingly, the polymeric materials obtained by the invention can be used as conductive materials or antistatic coatings for applying in electronic elements and hence have industrial practicability.

EXAMPLES

The invention will be further described by means of the following illustrative but not limitative examples.

Example 1
Chemical synthesis of emeraldine base (polymer 1)

Figure 1:
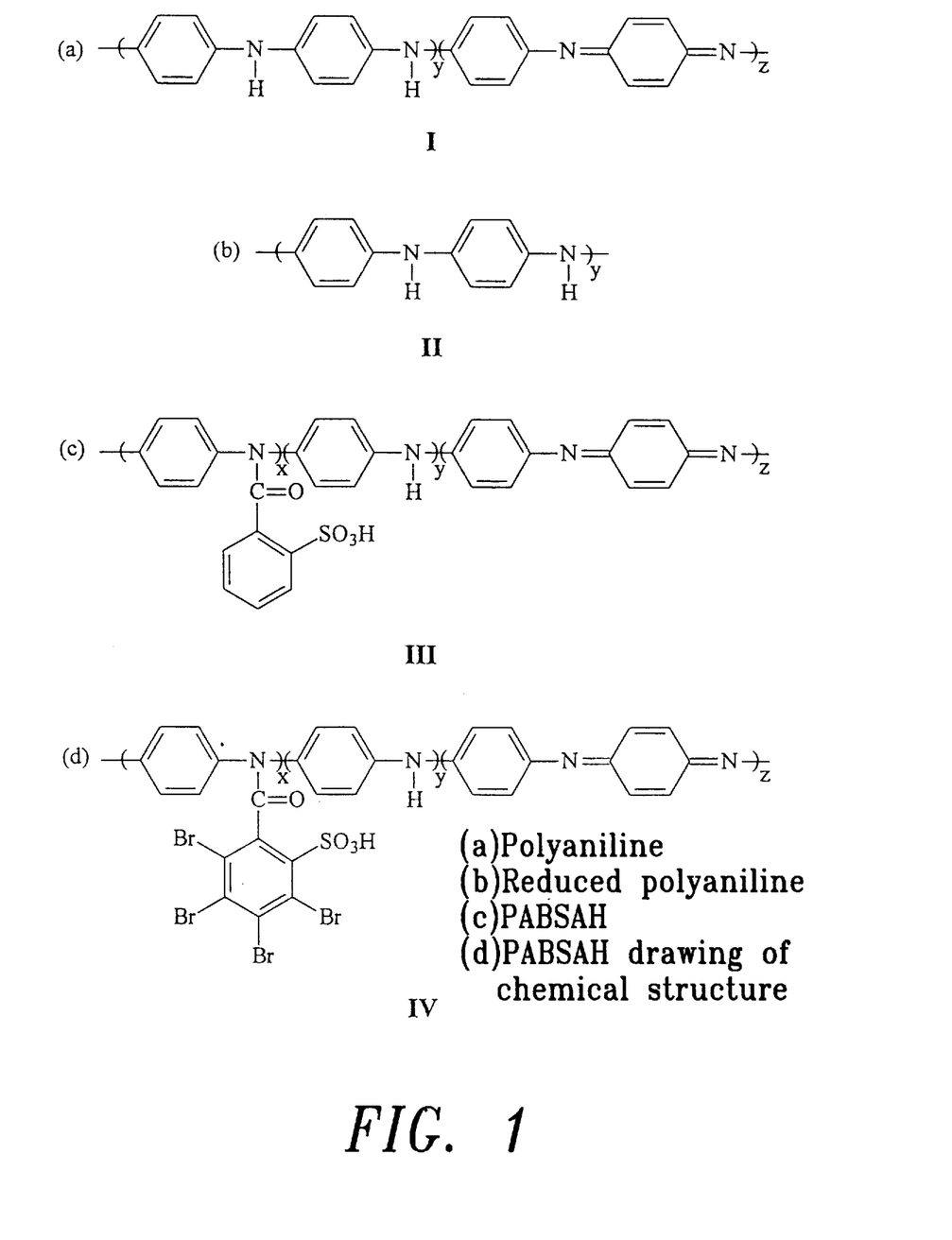
FIG. 1 shows structural formula of polymers prepared according to the invention.

To a four-necked reaction flask, 1800 g H$_2$O, 200 g 37% HCl (2.0 mol) and 95 g aniline (1.0 mol) were charged and stirred by a magnetic stirring bar to form a homogeneous solution which was cooled by an ice bath to 0° C. and was purged with nitrogen gas through a nitrogen inlet tube. An oxidant solution was prepared by mixing homogeneously 342 g ammonium persulfate (1.5 mol), 200 g 37% HCl (2.0 mol) and 1000 g H$_2$O and then, was added through a dropping funnel over one hour into the above reaction mixture. After reacting for few minutes, green particulates were formed. After complete addition, the original reaction condition was maintained for 9 hours. At this time, the solution became dark green. The solution was filtered and the dark green precipitate recovered was poured into 1000 ml 2N HCl for washing. This washing was repeated three times. Then, the precipitate was washed three times each with 1000 ml deionized water where the filtrate was near colorless. Thereafter, the dark green precipitate was poured into 1000 ml 3N NH$_4$OH for undoping over 24 hours. The precipitate was then filtered and washed with 1000 ml each of H$_2$O for three times and filtered again. Finally, after drying under vacuum at 40° C., a dark brown emeraldine base (FIG. 1(a)) powder was obtained.

Example 2
Synthesis of reduced polyaniline (polymer II)

18.1 g emeraldine base (polymer I) powder was dispersed in 200 ml methanol, and was stirred under purging with nitrogen. In the above solution, 21.6 g phenylhydrazine was added and a reduction reaction was carried out at 25° C. for 24 hours. The resulted brown solution was filtered and the solid recovered was washed with 200 ml methanol and then 200 ml ethanol. After drying under vacuum for 48 hours, a grayish white reduced polyaniline (FIG. 1(b)) was obtained.

Figure 2:
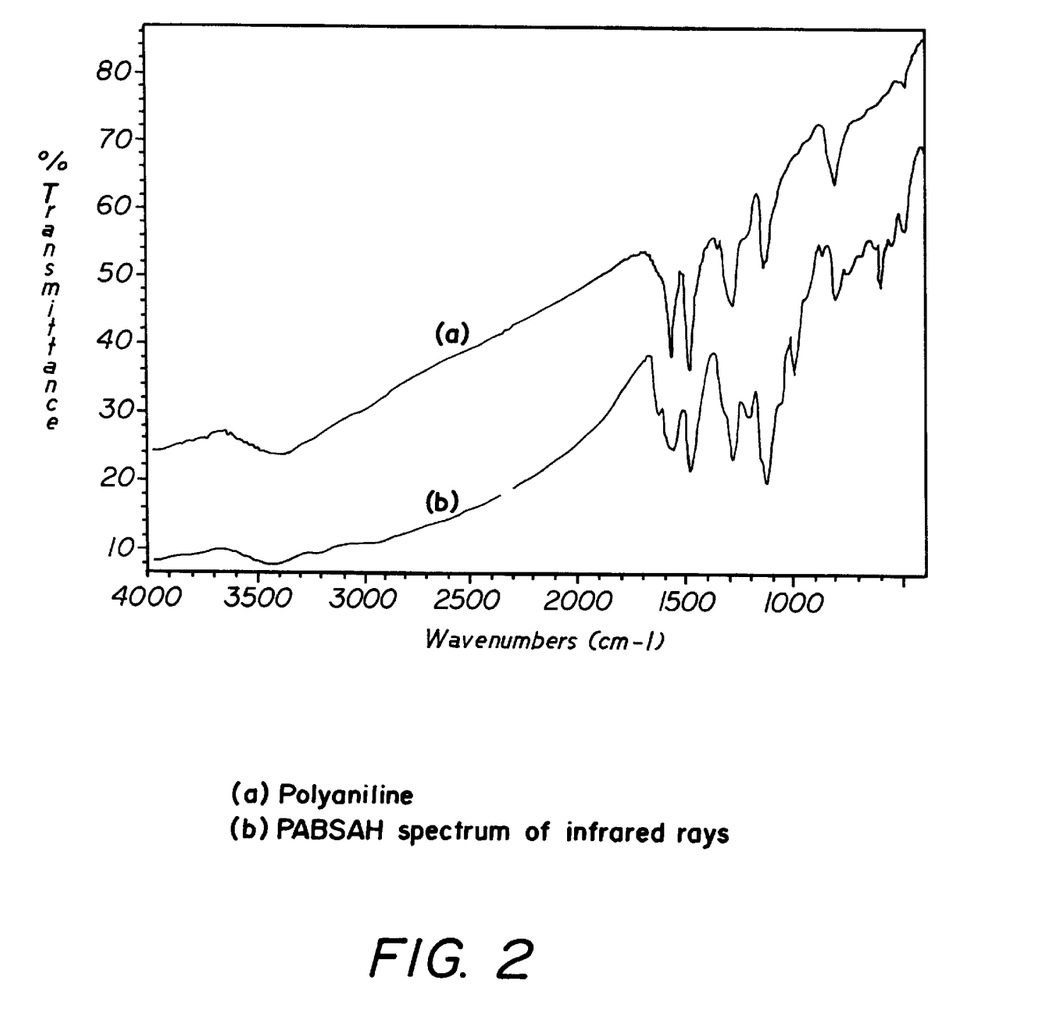
FIG. 2 shows infrared spectra of polymers prepared according to the invention.
Figure 3:
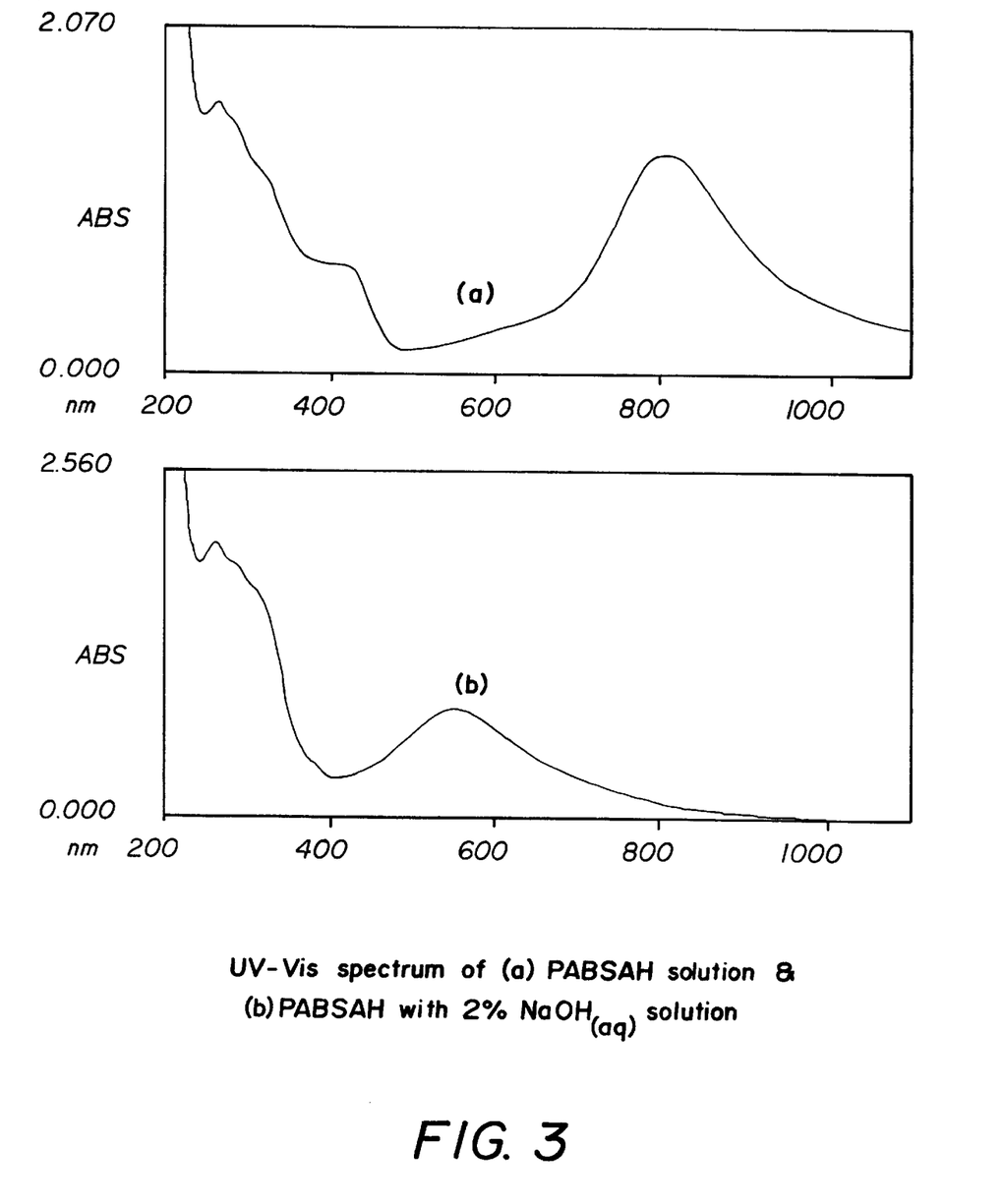
FIG. 3 shows the UV-VIS spectra of polymers prepared according to the invention.
Figure 4:
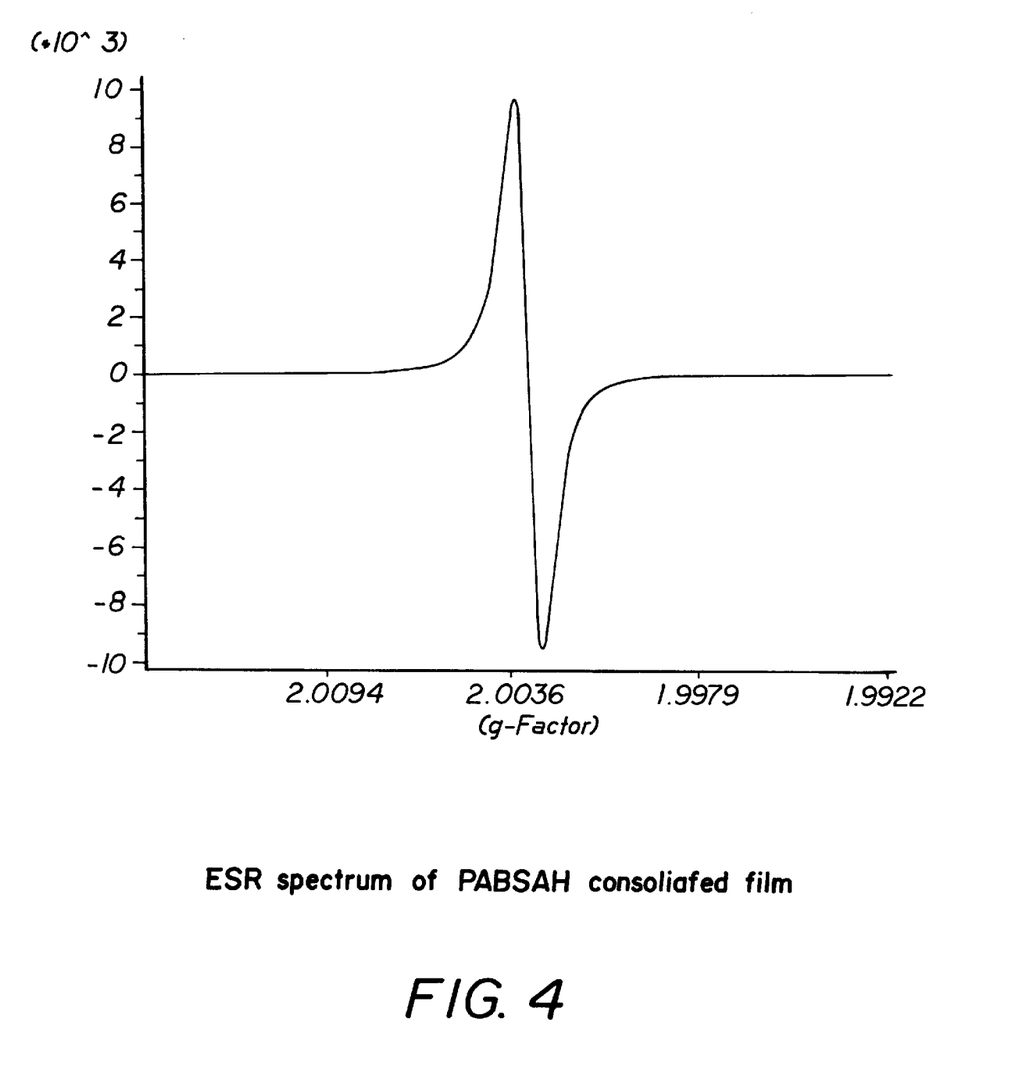
FIG. 4 shows the ESR spectra of polymers prepared according to the invention.

Example 3
Synthesis of polymer IIIa: reaction of emeraldine base with 2-sulfobenzoic anhydride To a three-necked reaction flask, 1.81 g (0.02 equivalent) polymer I, 1.60 g pyridine, and 100 g N-methyl-2-pyrrlidone (NMP) were charged, and the resulted mixture was stirred with a magnetic stirrer under purging with nitrogen to dissolve the solid. Then, 3.66 g (0.02 equivalent) of 2-sulfobenzoic anhydride and 10 g NMP was added dropwise in the reaction flask under 25° C. and a reaction was carried out for 8 hours. The reaction product was poured into 30 ml 1.0 N HCl$_{(aq)}$ for doping and precipitating the resulted polymer which was washed three times with 200 ml each of acetone to remove residual HCl. The polymer product thus recovered was dissolved in 5% NaOH$_{(aq)}$ for undoping. The solution fully undoped was filtered to remove trace insolubles and was placed in a semi-permeable membrane. After dialyzing out excess NaOH by frequently replacing deionized water, the desired polymer, poly(anilne-co-N-benzoyl sodium sulfonate aniline) (PABSANa) was obtained. After treating an aqueous solution of PABSANa with H$^+$-form ion exchange resin to exchange Na$^+$ into H$^+$, an aqueous solution of poly(aniline-co-N-benzoyl sulfonic acid aniline) (PABSAH) (polymer IIIa) (FIG. 1(c)) was obtained. This solution can be concentrated and cast into a film or coated over a substrate. After drying under vacuum, the product was pressed into a disk and measured by 4-point probe method to give an electric conductivity of about 9.3×10$^{-5}$ S/cm. Infrared spectroscopy (FIG. 2) revealed absorption peaks at 1018 cm$^{-1}$(υ s SO$_2$), 1145 cm$^{-1}$(υ as SO$_2$) and 800–600 cm$^{-1}$(υ S—O) which indicate the presence of SO$_3$—group in the polymer IIIa; and the presence of absorption peak at 820 cm$^{-1}$(C—H out-of-plane bending of 1,4-disubstituted benzene ring) indicated the polymer IIIa, like polyaniline, was 1,4-disubstituted and no addition reaction had been occurred on the ring; whereas the absorption at 1640 cm$^{-1}$(υ C=O) indicated that the benzenesulfonic acid should be grafted to the polyaniline in an amide configuration. Further, in the UV-VIS spectra thereof (FIG. 3), the absorption at 263 nm was due to the π–π* transition of benzenoid ring in the sulfonated phenyl group, and the absorption peaks at 420 nm and 805 nm were due to the polaron/bipolaron energy band transitions which indicates the doped state of the polymer IIIa in the aqueous solution. When the polymer IIIa was dissolved in 2% $NaOH_{(aq)}$ and was converted into its sodium salt, PABSANa, the absorption peaks due to the polaron/bipolaron transition disappeared, while, a new absorption peak appeared at 553 nm which was assignated to the exciton transition of quinoid ring. Elemental analysis shew a S/N ratio of 0.31 which indicated an amide grafting ratio of 31%. The above-described results in combination with ESR spectra (FIG. 4) revealed that polymer IIIa was a self-acid-doped conductive polymer. After drying under vacuum, this polymer IIIa could be redissolved in aqueous NaOH solution, but not in water.

Example 4

Synthesis of polymer IIIb: reaction of emeraldine base with 2-sulfobenzoic anhydride To a three-necked reaction flask, 1.81 g (0.02 equivalent) polymer I and 100 g N-methyl-2-pyrrlidone (NMP) were charged, and the resulted mixture was stirred with a magnetic stirrer under purging with nitrogen to dissolve the solid. Then, 3.66 g (0.02 equivalent) of 2-sulfobenzoic anhydride and 10 g NMP was added dropwise in the reaction flask under 25° C. and a reaction was carried out for 24 hours. The reaction mixture was poured into 200 ml of acetone for precipitating the resulted polymer which was filtered and washed three times with 200 ml each of acetone. After drying under vacuum, the desired poly(aniline-co-N-benzoyl sulfonic acid aniline) (PABSAH) (polymer IIIb) was obtained. The product was pressed into a disk and measured by 4-point probe method to give an electric conductivity of about $3.0\times10^{-4}$ S/cm. Infrared spectroscopy revealed absorption peaks at 1018 cm$^{-1}$(υ s $SO_2$), 1145 cm$^{-1}$(υ as $SO_2$) and 800–600 cm$^{-1}$(υ S—O) which indicate the presence of $SO_3^-$ group in the polymer IIIb; and the presence of absorption peak at 820 cm$^{-1}$(C—H out-of-plane bending of 1,4-disubstituted benzene ring) indicated the polymer IIIb, like polyaniline, was 1,4-disubstituted and no addition reaction had been occurred on the ring; whereas the absorption at 1640 cm$^{-1}$(υ C=O) indicated that the benzenesulfonic acid should be grafted to the polyaniline in an amide configuration. Further, in the UV-VIS spectra thereof, the absorption at 264 nm was due to the π–π* transition of benzenoid ring in the sulfonated phenyl group, and the absorption peaks at 420 nm and 848 nm were due to the polaron/bipolaron energy band transitions which indicates the doped state of the polymer IIIb in the aqueous solution. When the polymer IIIb was dissolved in 2% $NaOH_{(aq)}$ and thereby was converted into its sodium salt, PABSANa, the absorption peaks due to the polaron/bipolaron transition disappeared, while, a new absorption peak appeared at 575 nm which was assignated to the exciton transition of quinoid ring. Elemental analysis show a S/N ratio of 0.38 which indicated an amide grafting ratio of 38%. The above-described results in combination with ESR spectra revealed that polymer IIIb was a self-acid-doped conductive polymer. After drying under vacuum, this polymer IIIb could be redissolved in water or aqueous NaOH solution.

Example 5

Synthesis of polymer IIIc: reaction of reduced polyaniline with 2-sulfobenzoic anhydride To a three-necked reaction flask, 1.80 g (0.02 equivalent) polymer II, 1.60 g pyridine, and 100 g N-methyl-2-pyrrlidone (NMP) were charged, and the resulted mixture was stirred with a magnetic stirrer under purging with nitrogen to dissolve the solid. Then, 3.66 g (0.02 equivalent) of 2-sulfobenzoic anhydride and 10 g NMP was added dropwise in the reaction flask under 25° C. and a reaction was carried out for 12 hours. The reaction mixture was poured into 200 ml of acetone for precipitating the resulted polymer which was filtered and washed three times with 200 ml each of acetone. After drying under vacuum, the desired poly(aniline-co-N-benzoyl sulfonic acid aniline) (PABSAH) (polymer IIIc) was obtained. The product was pressed into a disk and measured by 4-point probe method to give an electric conductivity of about $4.5\times10^{-5}$ S/cm. Infrared spectroscopy revealed absorption peaks at 1021 cm$^{-1}$(υ s $SO_2$), 1197 cm$^{-1}$(υ as $SO_2$) and 800–600 cm$^{-1}$(υ S—O) which indicate the presence of $SO_3^-$ group in the polymer IIIc; and the presence of absorption peak at 820 cm$^{-1}$(C—H out-of-plane bending of 1,4-disubstituted benzene ring) indicated the polymer IIIc, like polyaniline, was 1,4-disubstituted and no addition reaction had been occurred on the ring; whereas the absorption at 1640 cm$^{-1}$(υ C=O) indicated that the benzenesulfonic acid should be grafted to the polyaniline in an amide configuration. Further, in the UV-VIS spectra thereof, the absorption at 263 nm was due to the π–π* transition of benzenoid ring in the sulfonated phenyl group, and the absorption peaks at 382 nm and 818 nm were due to the polaron/bipolaron energy band transitions which indicates the doped state of the polymer IIIc in the aqueous solution. When the polymer IIIc was dissolved in 2% $NaOH_{(aq)}$ and was converted into its sodium salt, PABSANa, the absorption peaks due to the polaron/bipolaron transition disappeared, while, a new absorption peak appeared at 605 nm which was assignated to the exciton transition of quinoid ring. The above-described results in combination with ESR spectra revealed that polymer IIIc was a self-acid-doped conductive polymer. After drying under vacuum, this polymer IIIc could be redissolved in water or aqueous NaOH solution.

Example 6

Synthesis of polymer IIId: reaction of emeraldine base with 3,4,5,6-tetrabromo-2-sulfobenzoic anhydride To a three-necked reaction flask, 0.91 g (0.01 equivalent) polymer I and 50 g N-methyl-2-pyrrlidone (NMP) were charged, and the resulted mixture was stirred with a magnetic stirrer under purging with nitrogen to dissolve the solid. Then, 5.0 g (0.01 equivalent) of 3,4,5,6-tetrabromo-2-sulfobenzoic anhydride and 10 g NMP was added dropwise in the reaction flask under 25° C. and a reaction was carried out for 48 hours. The reaction product was poured into 200 ml acetone to precipitate the resulted polymer which was filtered and washed three times with 200 ml each of acetone The polymer product thus recovered was dissolved in 5% $NaOH_{(aq)}$ for undoping. The solution fully undoped was filtered to remove trace insolubles and was placed in a semi-permeable membrane. After dialyzing out excess NaOH by frequently replacing deionized water, the desired polymer, poly(anilne-co-N-3,4,5,6-tetrabromobenzoyl sodium sulfonate aniline) (PATSANa) was obtained. After treating an aqueous solution of PABSANa with H$^+$-form ion exchange resin to exchange Na$^+$ into H$^+$, an aqueous solution of poly(aniline-co-N-3,4,5,6-tetrabromobenzoyl sulfonic acid aniline) (PATSAH) (polymer IIId) was obtained. After drying under vacuum, the product was pressed into a disk and measured by 4-point probe method to give an electric conductivity of about $2.0\times10^{-6}$ S/cm. Infrared spectroscopy revealed absorption peaks at 1038 cm$^{-1}$(υ s $SO_2$), 1094 cm$^{-1}$(υ as $SO_2$) and 800–600 cm$^{-1}$(υ S—O) which indicate the presence of SO$_3^-$ group in the polymer IIId; and the presence of absorption peak at 821 cm$^{-1}$(C—H out-of-plane bending of 1,4-disubstituted benzene ring) indicated the polymer IIId, like polyaniline, was 1,4-disubstituted and no addition reaction had been occurred on the ring; whereas the absorption at 1649 cm$^{-1}$(υ C=O) indicated that the benzenesulfonic acid should be grafted to the polyaniline in an amide configuration. Further, in the UV-VIS spectra thereof, the absorption at 231 nm was due to the π–π* transition of benzenoid ring in the sulfonated 3,4,5,6-tetrabromophenyl group, and the absorption peaks at 420 nm and 980 nm were due to the polaron/bipolaron energy band transitions which indicates the doped state of the polymer IIId in the aqueous solution. When the polymer IIId was dissolved in 2% NaOH$_{2(aq)}$ and was converted into its sodium salt, PATBSANa, the absorption peaks due to the polaron/bipolaron transition disappeared, while, a new absorption peak appeared at 600 nm which was assignated to the exciton transition of quinoid ring. The above-described results in combination with ESR spectra revealed that polymer IIId was a self-acid-doped conductive polymer. After drying under vacuum, this polymer IIId could be redissolved in aqueous NaOH solution, but not in water.

Example 7

Synthesis of polymer IIIe: reaction of reduced polyaniline, n-decanoyl chloride and 2-sulfobenzoic anhydride To a three-necked reaction flask, 1.80 g (0.02 equivalent) polymer II, and 100 g N-methyl-2-pyrrlidone (NMP) were charged, and the resulted mixture was stirred with a magnetic stirrer under purging with nitrogen to dissolve the solid. Then, 1.91 g (0.01 equivalent) of n-decanoyl chloride was added in the reaction flask and the resulted mixture was reacted for 12 hours. Thereafter, a solution of 1.83 g(0.01 equivalent) 2-sulfobenzoic anhydride and 10 g NMP was added dropwise in the reaction flask under 25° C. and a reaction was carried out for 12 hours. The reaction mixture was poured into 200 ml of acetone for precipitating the resulted polymer which was filtered and washed three times with 200 ml each is of acetone. After drying under vacuum, the desired poly(aniline-co-N-n-decanoyl aniline-co-N-benzoyl sulfonic acid aniline) (PADSAM (polymer IIIe) was obtained.The product was pressed into a disk and measured by 4-point probe method to give an electric conductivity of about 1.5×10$^{-5}$ S/cm. Infrared spectroscopy revealed absorption peaks at 1031 cm$^{-1}$(υ s SO$_2$), 1187 cm$^{-1}$(υ as SO$_2$) and 800–600 cm$^{-1}$(υ S—O) which indicate the presence of SO$_3^-$ group in the polymer IIIe; and the presence of absorption peak at 822 cm$^{-1}$(C—H out-of-plane bending of 1,4-disubstituted benzene ring) indicated the polymer IIIe, like polyaniline, was 1,4-disubstituted and no addition reaction had been occurred on the ring; whereas the absorption at 1640 cm$^{-1}$(υ C=O) indicated that the benzenesulfonic acid should be grafted to the polyaniline in an amide configuration; and, in addition, the absorption at 2950 and 2850 cm$^{-1}$(υ C—H$_2$) suggested that the decanoyl had been grafted on the polyaniline. Further, in the UV-VIS spectra thereof, the absorption at 256 nm was due to the π–π* transition of benzenoid ring in the sulfonated phenyl group, and the absorption peaks at 420 nm and 824 nm were due to the polaron/bipolaron energy band transitions which indicates the doped state of the polymer IIIe in the aqueous solution. When the polymer IIIe was dissolved in 2% NaOH$_{(aq)}$ and was converted into its sodium salt, PADSANa, the absorption peaks due to the polaronibipolaron transition disappeared, while, a new absorption peak appeared at 611 nm which was assignated to the exciton transition of quinoid ring. The above-described results revealed that polymer IIIe was a self-acid-doped conductive polymer. After drying under vacuum, this polymer IIIe could be redissolved in tetrahydrofuran containing small amount of water (e.g., 5 wt %).

Many changes and modifications in the above described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A water-soluble self-acid-doped N-2-sulfobenzoyl-substituted polyaniline derivatives obtained by reacting polyaniline derivatives with 2-sulfobenzoic anhydride derivatives, which is composed of structural unit having following formula (I):

wherein,

M may be H, Na, K or NH$_4$;

R$_1$, R$_2$, R$_3$, R$_4$ may be —H, —R$_o$, —F, —Cl, —Br, —OR$_o$, —COR$_o$, —OCOR$_o$, —NHCOR$_o$, —NO$_2$, —COOR$_o$, —CN, or —COOH;

Q may be —H, —R$_o$, —F, —Cl, —Br, —OR$_o$, —COR$_o$, —OCOR$_o$, —NHCOR$_o$, —NO$_2$, —COOR$_o$, —CN, —COOH;

R$_o$ is a C$_1$–C$_4$ alkyl;

n is an integer of 0 to 4; and x+y+2z≦1.0, and x≧0.1.

2. A water-soluble self-acid-doped N-2-sulfobenzoyl-substituted polyaniline derivatives according to claim 1, wherein Q in formula (I) is —H.

3. A water-soluble self-acid-doped N-2-sulfobenzoyl-substituted polyaniline derivatives according to claim 1, wherein Q in formula (I) is —Br.

4. A water-soluble self-acid-doped N-2-sulfobenzoyl-substituted polyaniline derivatives according to claim 1, wherein said 2-sulfobenzoic anhydride derivatives may be selected from those having the following structural formula (II):

wherein,

Q may be —H, —R$_o$, —F, —Cl, —Br, —OR$_o$, —COR$_o$, —OCOR$_o$, —NHCOR$_o$, —NO$_2$, —COOR$_o$, —CN, —COOH;

R$_o$ is a C$_1$–C$_4$ alkyl;

n is an integer of 0 to 4.

5. A water-soluble self-acid-doped N-2-sulfobenzoyl-substituted polyaniline derivatives according to claim 1, wherein said 2-sulfobenzoic anhydride derivatives is 2-sulfobenoic anhydride.

6. A water-soluble self-acid-doped N-2-sulfobenzoyl-substituted polyaniline derivatives according to claim 1, wherein said 2-sulfobenzoic anhydride derivatives is 3,4,5,6-tetrabromo-2-sulfobenzoic anhydride.

7. A water-soluble self-acid-doped N-2-sulfobenzoyl-substituted polyaniline derivatives according to claim 1, wherein x is a range of 0.1 to 0.9.

8. A water-soluble self-acid-doped N-2-sulfobenzoyl-substituted polyaniline derivatives according to claim 1; wherein x is in a range of 0.2 to 0.7.

9. A water-soluble self-acid-doped N-2-sulfobenzoyl-substituted polyaniline derivatives according to claim 1, wherein y is in a range of 0.1 to 0.5.

10. A water-soluble self-acid-doped N-2-sulfobenzoyl-substituted polyaniline derivatives according to claim 1, wherein z is in a range of 0.025 to 0.25.

11. A water-soluble self-acid-doped N-2-sulfobenzoyl-substituted polyaniline derivatives according to claim 1, wherein the molecular weight thereof is in a range of 1,000 to 1,000,000.

12. A process for preparing water-soluble self-acid-doped N-2-sulfobenzoyl substituted polyaniline derivatives, said process comprising reacting polyaniline derivatives with 2-sulfobenzoic anhydride derivatives in a solvent and, optionally, in the presence of a catalyst, and precipitating and drying the reaction product, wherein said water-soluble self-acid-doped N-2-sulfobenzoyl substituted polyaniline derivatives are defined as in claim 1.

13. A process according to claim 12, wherein said catalyst is pyridines.

14. A process according to claim 13, wherein said pyridines is pyridine.

15. A process according to claim 13, wherein said pyridines is 4-dimethylaminopyridine.

16. A process according to claim 12, comprises further a step of treating the reaction product with ion exchange resin to convert into a doped state thereof.

17. A process according to claim 12 or 16, comprises further a step of treating the reaction product with a semi-permeable membrane to remove contaminating ion before treating with said ion exchange resin.

18. A water-soluble self-acid-doped N-2-sulfobenzoyl-substituted polyaniline btained by reacting polyaniline with 2-sulfobenzoic anhydride derivatives, which is composed of structural unit having following formula (Ia):

wherein,

M may be H, Na, K or $NH_4$;

Q may be —H, —$R_o$, —F, —Cl, —Br, —$OR_o$, —$COR_o$, —$OCOR_o$, —$NHCOR_o$, —$NO_2$, —$COOR_o$, —CN, —COOH;

$R_o$ is a $C_1$–$C_4$ alkyl;

n is an integer of 0 to 4; and $x+y+2z \leq 1.0$, and $x \geq 0.1$.

19. A water-soluble self-acid-doped N-2-sulfobenzoyl-substituted polyaniline according to claim 18, wherein Q in formula (Ia) is —H.

20. A water-soluble self-acid-doped N-2-sulfobenzoyl-substituted polyaniline according to claim 18, wherein Q in formula (Ia) is —Br.

21. A water-soluble self-acid-doped N-2-sulfobenzoyl-substituted polyaniline according to claim 18, wherein said 2-sulfobenzoic anhydride derivatives may be selected from those having the following structural formula (II):

wherein,

Q may be —H, —$R_o$, —F, —Cl, —Br, —$OR_o$, —$COR_o$, —$OCOR_o$, —$NHCOR_o$, —$NO_2$, —$COOR_o$, —CN, —COOH;

$R_o$ is a $C_1$–$C_4$ alkyl;

n is an integer of 0 to 4.

22. A water-soluble self-acid-doped N-2-sulfobenzoyl-substituted polyaniline according to claim 18, wherein said polyaniline is a reduced polyaniline or leucoemeraldine base.

23. A water-soluble self-acid-doped N-2-sulfobenzoyl-substituted polyaniline according to claim 18, wherein said polyaniline is an emeraldine base.

24. A water-soluble self-acid-doped N-2-sulfobenzoyl-substituted polyaniline according to claim 18, wherein said 2-sulfobenzoic anhydride derivatives is 2-sulfobenzoic anhydride.

25. A water-soluble self-acid-doped N-2-sulfobenzoyl-substituted polyaniline according to claim 18, wherein said 2-sulfobenzoic anhydride derivatives is 3,4,5,6-tetrabromo-2-sulfobenzoic anhydride.

26. A water-soluble self-acid-doped N-2-sulfobenzoyl-substituted polyaniline according to claim 18, wherein x is a range of 0.1 to 0.9.

27. A water-soluble self-acid-doped N2-sulfobenzoyl-substituted polyaniline according to claim 18, wherein x is in a range of 0.2 to 0.7.

28. A water-soluble self-acid-doped N-2-sulfobenzoyl-substituted polyaniline according to claim 18, wherein y is in a range of 0.1 to 0.5.

29. A water-soluble self-acid-doped N-2-sulfobenzoyl-substituted polyaniline according to claim 18, wherein z is in a range of 0.025 to 0.25.

30. A water-soluble self-acid-doped N-2-sulfobenzoyl-substituted polyaniline according to claim 18, wherein the molecular weight thereof is in a range of 1,000 to 1,000,000.

31. A process for preparing water-soluble self-acid-doped N-2-sulfobenzoyl substituted polyaniline, said process comprising reacting polyaniline with 2-sulfobenzoic anhydride derivatives in a solvent and, optionally, in the presence of a catalyst, and precipitating and drying the reaction product, wherein said water-soluble self-acid-doped N-2-sulfobenzoyl substituted polyaniline are defined as in claim 18.

32. A process according to claim 31, wherein said catalyst is pyridines.

33. A process according to claim 32, wherein said pyridines is pyridine.

34. A process according to claim 32, wherein said pyridines is 4-dimethylaminopyridine.

35. A process according to claim 31, comprises further a step of treating the reaction product with ion exchange resin to convert into a doped state thereof.

36. A process according to claim 31 or 35, comprises further a step of treating the reaction product with a semi-permeable membrane to remove contaminating ion before treating with said ion exchange resin.

37. A water-soluble self-acid-doped N-2-sulfobenzoyl-substituted polyaniline derivatives according to claim 1, comprises further a structural unit represented by the following formula (III):

(III)

wherein,

$R_1$, $R_2$, $R_3$, $R_4$ may be —H, —$R_o$, —F, —Cl, —Br, —$OR_o$, —$COR_o$, —$OCOR_o$, —$NHCOR_o$, —$NO_2$, —$COOR_o$, —CN, or —COOH;

$R_o$ is a $C_1$–$C_4$ alkyl;

$R_5$ is an alkyl or alkenyl having a carbon number of 6 to 18; and $x+y+2z \leq 1.0$, and $x \geq 0.1$.

38. A water-soluble self-acid-doped N-2-sulfobenzoyl-substituted polyaniline derivatives according to claim 1, comprises further a structural unit represented by the following formula (IIIa):

(IIIa)

wherein, $R_5$ is an alkyl or alkenyl having a carbon number of 6 to 18; and $x+y+2z \leq 1.0$, and $x \geq 0.1$.

* * * * *